United States Patent Office 3,135,796
Patented June 2, 1964

3,135,796
PRODUCTION OF N,N'-DI(1-METHYLALKYLI-
DENE)-p-PHENYLENEDIAMINE
Robert W. Layer, Cuyahoga Falls, and John C. McCool,
Akron, Ohio, assignors to The B. F. Goodrich Company, New York, N.Y., a corporation of New York
No Drawing. Filed Aug. 31, 1961, Ser. No. 135,122
10 Claims. (Cl. 260—566)

This invention relates to the commercial production of N,N'-di(1-methylalkylidene)-p-phenylenediamines by the reflux reaction of commercial p-phenylenediamines with commercial methyl alkyl ketones, and especially to the economical commercial production in high yields of the N,N'-di(1-methylheptylidene)-p-phenylenediamines.

Applicants have demonstrated by extensive testings that all commercial methyl alkyl ketones and especially methyl hexyl ketone, or 2-octanone, contain strongly acidic impurities, in varying amounts from lot to lot, which strongly acidic impurities, even in trace amounts, catalyze the aldol condensation of the di(1-methylalkylidene)-p-phenylenediamines to form unwanted higher polyalkylidene-p-phenylenediamine compounds, referred to herein as "hi-boils," with the result that reproducible commercial runs of the production of di(1-methylalkylidene)-p-phenylenediamines from commercial methyl alkyl ketones are not possible of attainment because of the varying substantial yields of unwanted "hi-boils" and the relatively lower yields of the desired di(1-methylalkylidene)-p-phenylenediamines, one of the principal commercial uses of which is to form by the catalytic hydrogenation di(1-methylalkyl)-p-phenylenediamines, a powerful class of antiozonants for rubber and plastics. Where the "hi-boils" are present in substantial quantities with the di(1-methylalkylidene)-p-phenylenediamines, the "hi-boils" are reduced to the corresponding amines by the catalytic hydrogenation, along with the di(1-methylalkylidene)-p-phenylenediamines, but these reduced "hi-boils" are not only detrimental to the antiozonant properties of the di(1-methylalkyl)-p-phenylenediamine antiozonants, but also represent a waste not only of expensive p-phenylenediamine but also of the desired di(1-methylalkylidene)-p-phenylenediamines.

Applicants have demonstrated in an extended series of experiments, as well as in actual commercial production, that the preliminary purification of the commercial methyl alkyl ketones to remove therefrom the harmful strongly acidic impurities is not only an expensive operation but is also an operation by which it is not always possible to remove all traces of the strongly acidic impurities, and hence is not a feasible commercial operation either from the standpoint of cost or from the standpoint of high yield of the desired final product, namely, di(1-methylalkylidene)-p-phenylenediamines.

As a result of an extensive program of research, applicants have discovered a novel class of catalyst systems comprising (a) certain organic acids and (b) certain organic acid salts of alkaline metals, the presence of which catalyst system during the reaction of a commercial methyl alkyl ketone and a commercial p-phenylenediamine accomplishes a two-fold beneficial purpose: (1) the novel catalyst system of this invention converts the strong acidic impurities of the starting chemicals into organic acids and harmless salts, and hence eliminates the formation of the unwanted aldol condensation products, or "hi-boils," within the reaction admixture, and (2) the novel catalyst system of this invention does not catalyze the unwanted polyalkylidene-p-phenylenediamines or "hi-boils," but does most effectively catalyze the desired reaction to produce the di(1-methylalkylidene)-p-phenylenediamines in high yields and in relatively short times.

The novel process of this invention comprises the reflux reaction of a commercial methyl alkyl ketone and a commercial p-phenylenediamine in the presence of the novel catalyst system comprising (1) an organic acid and (2) an alkaline metal salt of an organic acid, which reaction is represented by the following equation:

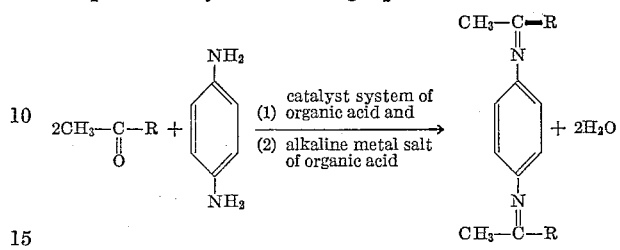

wherein R is an alkyl radical having from 1 to 11 or more carbon atoms. Preferably, the refluxing reaction is carried out at such temperatures and pressures that the water of condensation is removed from the reaction mixture as it is formed, in effect making the reaction substantially a reflux reaction.

Of the organic acids effective in the catalyst system of this invention are organic acids of the formula R'COOH, wherein R' is a hydrocarbon radical having from 1 to 18, or more carbon atoms, as ethanoic or acetic acid, propanoic or methyl acetic acid, butanoic or butyric acid, pentanoic or n-valeric acid, n-hexanoic or caproic acid, n-heptanoic or enanthic acid, n-octanoic or caprylic acid, n-nonanoic or pelargonic acid, n-decanoic or capric acid, n-undecanoic or hendecanoic acid, n-dodecanoic or lauric acid, octadecanoic or stearic acid, or like alkyl organic acids, as well as carbolic acid, benzoic acid, the methylbenzoic acids or the toluic acids, the dimethyl benzoic acids, and like aryl organic acids.

Of the alkaline metal salts of the organic acids, effective in the catalyst system of this invention, are those of the formula R'COOMe, wherein R' has the same significance as above defined in the formula R'COOH, and Me is an alkali metal of groups IA or IIA of the periodic chart of the elements, as set forth on pages 392–393 of the "Handbook of Chemistry and Physics," Thirty-Sixth Edition, published by Chemical Rubber Publishing Co., 2310 Superior Avenue, NE., Cleveland, Ohio, and of which lithium, sodium, potassium, rubidium, cesium, francium, beryllium, magnesium, calcium, strontium, barium, and radium are examples.

The two constituents of the novel catalyst system of this invention, namely, the R'COOH organic acid and the R'COOMe alkaline metal salt of an organic acid, may be added either (1) directly to the reaction mixture comprising the methyl alkyl ketone and the p-phenylenediamine, or (2) be formed in situ within the reaction mixture. Again, the R' of the R'COOH organic acid may or may not be the same hydrocarbon radical as the R' of the R'COOMe alkaline metal salt of an organic acid.

Generally, an organic acid having a relatively high boiling point is preferable, although an organic acid having a lower boiling point, such as acetic acid, is effective in the novel catalyst system. Thus, it is effective to use a high boiling organic acid, such as pelargonic acid with a boiling point of about 254° C. and an alkaline metal salt of any organic acid, as constituents of the novel catalyst system of this invention, including the use of an organic acid and an alkaline metal salt of that organic acid. Further, the alkaline metal salt of the organic acid may be formed in situ in the reaction admixture, as hereinafter more fully described.

The p-phenylenediamine reactant is a crystalline solid having a melting point of about 147° C. (297° F.), a boiling point of about 267° C. (512.6° F.), under normal atmospheric pressures, or 760 mm. of mercury, and oxidizes on standing in air. Because of these physical properties, the reaction between the p-phenylenediamine and the methyl alkyl ketone is preferably, but not necessarily, carried out at a vacuum pressure and in an inert circumambient gaseous atmosphere of nitrogen, helium, neon, or other inert gas, and the p-phenylenediamine is advantageously preheated to bring it into a flowable liquid condition, although the crystalline p-phenylenediamine may be charged into the reactor and therein, by placing the reactor contents under suitable vacuum pressures and suitable temperatures, be converted to its liquid form in the reaction mixture.

The methyl alkyl ketone reactants are liquids and serve as a liquid vehicle in which the p-phenylenediamine is dispersed, whether the latter is or is not first preheated to liquid condition. No other dispersing liquid is normally required since the water of condensation formed in the reaction is insoluble or only slightly soluble in the reactants and is thus readily separable from the reaction admixture by means of a Dean-Stark trap placed in the reflux stream. In reactions in which either the dimethyl or the methyl ethyl or the methyl propyl ketone is employed, in which ketones water is somewhat soluble, it may be desirable to add to the reaction admixture an entraining agent, such as an organic solvent, of which benzene, toluene and xylene are examples, to form an azeotropic admixture from which the water of condensation formed in the reaction may be more readily removed. When methyl butyl ketone or any of the higher methyl alkyl ketones is employed, ketones in which water is not soluble, then use of the added liquid entraining agent is not desirable.

To demonstrate the effect of strong acidic impurities in the reactants on the reaction of a methyl alkyl ketone and p-phenylenediamine, the following experiments were carried out.

*Experiment A.*—21.6 g. of pure p-phenylenediamine, 100 ml. of purified methyl hexyl ketone, 10 drops of caproic acid and 0.1 g. of sodium acetate were refluxed with the water of condensation being collected in a Dean-Stark trap, giving a 90% yield of a pure N,N'-di(1-methylheptylidene)-p-phenylenediamine in a one hour refluxing reaction.

*Experiment B.*—The same quantities and qualities of p-phenylenediamine, methyl hexyl ketone and caproic acid, with no sodium acetate, were used as in Experiment A, to which was added one drop of concentrated HCl, the reaction giving in two hours only a low yield (20%) of the N,N'-di(1-methylheptylidene)-p-phenylenediamine mixed with substantial amounts of "hi-boils." It is apparent that the strong acid obstructed the catalytic effect of the organic acid to produce the N,N'-di(1-methylheptylidene)-p-phenylenediamine but did act as a catalyst to produce the unwanted "hi-boils." To demonstrate that even trace amounts of strongly acidic impurities obstruct the catalytic effect of the organic acid, 1/100 of a drop of concentrated HCl was used, instead of the one drop of HCl, with the result that only low yields (26%) of the N,N'-di(1-methylheptylidene)-p-phenylenediamine were obtained with substantial amounts of "hi-boils."

*Experiment C.*—The same materials employed in Experiment B were used, including the one drop of HCl, but with 0.1 g. of sodium acetate added, as in Experiment A, with the result a 90% yield of the pure N,N'-di(1-methylheptylidene)-p-phenylenediamine in a one hour reaction, the sodium acetate having converted the HCl to acetic acid, an organic acid catalyzer, and harmless sodium chloride, and hence the HCl did not obstruct the catalytic effect of the novel catalyst system of this invention nor catalyze the unwanted side reactions producing "hi-boils."

EXAMPLE I

This example is to illustrate the invention of this application when the novel catalyst system, composed of an organic acid and an alkaline metal salt of the same organic acid, is added to the reaction mixture comprising a methyl alkyl ketone and p-phenylenediamine. In each of the tests hereinbelow recited, the reactants were placed in an autoclave reactor equipped with a refluxing system having a Dean-Stark trap to separate the water from the reflux stream, and maintained at a temperature and pressure that maintained a rapid refluxing action. Generally, a vacuum pressure is maintained in the reactor, although the vacuum pressure in the reactor is not critical and atmospheric or even higher pressures in the reactor are operative. For commercial operations, a reactor pressure of from 50 mm. to 400 mm. of mercury may be advantageously employed and the temperature of the reactor contents maintained at a range that provides free refluxing of the reactor contents at the reactor pressure.

Place in the refluxing reactor equipped with an agitator, a heating-cooling coil, a reflux condenser with a Dean-Stark water trap, means to maintain a vacuum pressure within the reactor, and means to blanket the reactor contents with an inert gas:

A. the starting chemicals consisting of: G.
  (1) p-Phenylenediamine (0.2 mole) _____ 21.6
  (2) Methyl hexyl ketone (0.6 mole) _____ 80.0
B. the catalyst system comprising:
  (a) Acetic acid _____ 0.2
  (b) Sodium acetate _____ 0.1

Heat the reactor preferably under a vacuum pressure of 50 to 100 mm. of mercury to a temperature that brings about a rapid refluxing of the reactor contents, say, from 80° to 100° C., separating the water of condensation as it is formed from the reflux stream in a Dean-Stark trap. After refluxing for one hour, the N,N'-di(1-methylheptylidene)-p-phenyenediamine was recovered by fractional distillation in vacuo. The yield was 49 g. (75% yield) of N,N'-di(1-methylheptylidene)-p-phenylenediamine having a boiling point of 171°–180° C. at 0.3 mm. of mercury and a set point of 24° C. (pure dianil has a set point of 24.5°–25° C.), indicating a commercial yield of high purity dianil.

In the following table are included the results obtained by using the above described process employing the same proportions of the same starting chemicals but catalyst systems embodying other organic acids and salts. For convenience, the resulting N,N'-di(1-methylalkylidene)-p-phenylenediamine is referred to hereinbelow as a "dianil," a term commonly used in the literature for a compound of this type:

*Table I*

| Expt. No. | Catalyst System | Dianil Yield, percent |
|---|---|---|
| 1 | propionic acid (B.P. 141° C.) and sodium propionate. | 80 |
| 2 | butyric acid (B.P. 163° C.) and sodium butyrate. | 83 |
| 3 | valeric acid (B.P. 187° C.) and sodium valerate. | 84 |
| 4 | caproic acid (B.P. 205° C.) and sodium caproate. | 92 |
| 5 | enanthic acid (B.P. 223° C.) and sodium enanthate. | 92 |
| 6 | caprylic acid (B.P. 237° C.) ans sodium caprylate. | 92 |
| 7 | pelargonic acid (B.P. 254° C.) and sodium pelargonate. | 93 |
| 8 | lauric acid (B.P. 225° C. at 100) and sodium laurate. | 94 |
| 9 | stearic acid (B.P. 383° C.) and sodium stearate. | 94 |
| 10 | benzoic acid (B.P. 249° C.) and sodium benzoate. | 85 |
| 11 | m-toluic acid (B.P. 263° C.) and sodium methylbenzoate. | 89 |
| 12 | carbolic acid (B.P. 182° C.) and sodium carbolate. | 82 |

In each of the above experiments, the resulting dianil was of 95% or higher purity. The above yields are not necessarily the maximum yields but are comparative yields in one hour, and are satisfactory commercial yields. It is noted that the higher boiling and water insoluble organic acids, as caproic and higher acids, give higher yields in a given time, namely, one hour of the experiments.

EXAMPLE II

This example is to illustrate the invention of this application when the novel catalyst system is composed of an organic acid and an alkaline salt of another organic acid. The reaction mixture is composed of the same starting chemicals and the procedure is the same as described in Example I above, but the catalyst system is made up of a combination of different organic acids and salts as below indicated:

Table II

| Expt. No. | Catalyst System | Dianil Yield, percent |
|---|---|---|
| 1 | propionic acid and sodium acetate | 82 |
| 2 | butyric acid and sodium acetate | 83 |
| 3 | caproic acid and sodium acetate | 92 |
| 4 | caprylic acid and sodium acetate | 96 |
| 5 | pelargonic acid and sodium acetate | 96 |
| 6 | lauric acid and sodium acetate | 94 |
| 7 | stearic acid and sodium acetate | 94 |

In each of the above experiments, the resulting dianil was of 95% or higher purity. The yields are not necessarily the maximum yield but are comparative yields in one hour, and are satisfactory commercial yields, the high boiling and water insoluble organic acids, as caproic and higher acids, give higher yields in a given time.

EXAMPLE III

This example is to illustrate the invention of this application when one of the components of the novel catalyst system is formed in situ within the reaction mixture. The apparatus for this process, as in Example I, comprises a reactor, preferably, but not necessarily, equipped with an agitator, a heating-cooling coil, a reflux condenser with a Dean-Stark water trap, means to maintain a vacuum pressure within the reactor, and means to provide a blanket of inert gas over the reaction admixture. The constituents of the reaction are as follows.

Parts by Weight: Constituents
100.0 _____ Commercial p-phenylenediamine.
509.0 _____ Commercial methyl hexyl ketone.
2.76 _____ Pelargonic acid.
0.46 _____ Sodium hydroxide (dry).

The p-phenylenediamine is preheated to a free flowing liquid (melting point about 297° F.), and charged into the reactor under a blanket of inert gas, as nitrogen, and the methyl hexyl ketone, preferably preheated to about 225° F., is added thereto, along with the pelargonic acid and dry sodium hydroxide. A vacuum pressure is maintained in the reactor, which may advantageously be 300 mm. of mercury, but pressures of from 50 mm. to 400 mm. of mercury have been found to be satisfactory. The reaction temperature at the start may be from 170° F. to 180° F., and increases during the reaction to from 270° F. to 290° F., a mean of 280° F. being satisfactory. After the reaction is commercially complete, the resulting N,N'-di(1-methylheptylidene)-p-phenylenediamine, or dianil, is recovered by fractional distillation in vacuo to yield 96% dianil of about 98% purity.

In the above example, the sodium hydroxide reacts with both the harmful strong acids and with the useful organic acids to form (1) harmless sodium salts of the strong acids and (2) the useful sodium salt of the pelargonic acid, this salt of an organic acid being formed in situ in the reaction mixture as an essential component of applicants' novel catalyst system.

Other caustic compounds may be substituted for the sodium hydroxide of the above example, and give excellent commercial yields, as is indicated in the table below, the same starting chemicals and procedure as above described being used and the catalyst system being made up of the organic acid and caustic of the formula MeOH, wherein Me has the same significance as it has in the formula R'COOMe:

Table III

| Expt. No. | Catalyst System | Dianil Yield, percent |
|---|---|---|
| 1 | acetic acid and sodium hydroxide | 75 |
| 2 | caproic acid and sodium hydroxide | 92 |
| 3 | caprylic acid and sodium hydroxide | 94 |
| 4 | stearic acid and sodium hydroxide | 94 |
| 5 | pelargonic acid and lithium hydroxide | 95 |
| 6 | pelargonic acid and potassium hydroxide | 94 |
| 7 | pelargonic acid and rubidium hydroxide | 90 |
| 8 | pelargonic acid and beryllium hydroxide | 92 |
| 9 | pelargonic acid and magnesium hydroxide | 92 |
| 10 | pelargonic acid and calcium oxide or hydroxide | 93 |
| 11 | pelargonic acid and strontium oxide or hydroxide | 90 |
| 12 | pelargonic acid and barium oxide or hydroxide | 90 |
| 13 | lauric acid and calcium oxide or hydroxide | 93 |
| 14 | stearic acid and magnesium oxide or hydroxide | 90 |

From the numerous experiments above listed, as well as from many other tests, applicants have established that any of the caustic hydroxides react with the strongly acidic impurities in the methyl alkyl ketones and also with the organic acids to convert the harmful strongly acidic impurities into harmless salts and into useful organic acid salts of the organic acids, to form one of the essential components of applicants' novel catalyst system in situ in the reaction mixture.

EXAMPLE IV

This example illustrates that the novel catalyst system is effective as a catalyst for the reaction of a p-phenylenediamine with any commercial methyl alkyl ketone. Thus, utilizing the equipment and procedure of the preceding Examples I to III, with the starting chemicals G.
1. p-Phenylenediamine (0.2 mole) _____ 21.6
2. Methyl alkyl ketone (0.6 mole) _____ 80.0 and the novel catalyst system of this invention (a) Acetic acid _____ 0.2
(b) Sodium acetate _____ 0.1
(c) Benzene (entraining agent) _____ 20.0

While it is not necessary in the above recipe to include the benzene entraining agent in the reactions involving the ketones 1, 2 and 3 marked with an * in Table IV below, which ketones are somewhat soluble in water, the reaction is so carried out to give specific examples of this reaction with the entraining agents hereinabove described. The reactions involving the ketones 4 to 10, which are not soluble in water, are preferably carried out without an entraining agent, although an entraining agent may be used, and represent the practical commercial method of producing the dianils in accord with the invention of this application.

Table IV

| Expt. No. | Methyl Alkyl Ketone | Dianil Yield, percent |
|---|---|---|
| 1 | di-methyl ketone* | 75 |
| 2 | methyl ethyl ketone* | 80 |
| 3 | methyl propyl ketone* | 85 |
| 4 | methyl butyl ketone | 90 |
| 5 | methyl amyl ketone | 90 |
| 6 | methyl hexyl ketone | 90 |
| 7 | methyl octyl ketone | 91 |
| 8 | methyl nonyl ketone | 92 |
| 9 | methyl decyl ketone | 92 |
| 10 | methyl dodecyl ketone | 93 |

EXAMPLE V

This example is to illustrate the invention of this application when the novel catalyst system is made up of any of the organic acids and any of the metal salts of the organic acids within the range of the formula R'COOMe, as above defined.

Utilizing the same equipment and procedure as fully described in connection with Examples I to IV, but employing the catalyst systems below indicated in Table V:

Table V

| Expt. No. | Catalyst System | Dianil Yield, percent |
|---|---|---|
| 1 | acetic acid and lithium acetate | 75 |
| 2 | valeric acid and potassium acetate | 80 |
| 3 | caproic acid and rubidium caproate | 87 |
| 4 | caprylic acid and magnesium caprylate | 90 |
| 5 | pelargonic acid and calcium pelargonate | 92 |
| 6 | lauric acid and strontium laurate | 90 |
| 7 | stearic acid and barium stearate | 92 |
| 8 | benzoic acid and cesium benzoate | 86 |
| 9 | carbolic acid and beryllium carbolate | 85 |

In each of the above experiments, the resulting dianil was of high purity and the yields commercial yields, although not necessarily the maximum yields, but comparative yields in the same reaction time.

Applicants have found that all of the novel catalyst systems within the scope of this invention, namely, an organic acid of the formula R'COOH and a metal salt of an organic acid of the formula R'COOMe, where R' and Me are as hereinabove defined, that they have tested, are operative whether the two components are added to the starting reactants or are formed in situ in the reaction mixture.

It is within the scope of this invention, although not commercial as at present evaluated, to add to the starting p-phenylenediamine and methyl alkyl ketone, where the ketone contains substantial quantities of highly acid impurities, which it usually does, a metal salt of an organic acid, R'COOMe, as above, in which case the acid impurity and the metal salt react to form an organic acid of the formula R'COOH, in situ, which with the R'COOMe salt makes up the novel catalyst system of this invention. Thus, where sodium acetate is added to the starting p-phenylenediamine and methyl alkyl ketone having strongly acidic impurities, there is formed in the reaction mixture, in situ, acetic acid, which with the sodium acetate, makes up the novel catalytic system of this invention.

The numerous examples and experiments hereinabove set out are to be considered as merely illustrative and not in limitation of the invention of this application, it being understood that the invention is broad to the novel catalyst system of this invention within the scope of the appended claims.

What is claimed is:

1. In the manufacture of a $N,N^1$-di(methylalkylidene)-p-phenylenediamine by the reaction of p-phenylenediamine with a methyl alkyl ketone having acid impurities therein, the process which comprises reacting under refluxing conditions an admixture of p-phenylenediamine and a methyl alkyl ketone having acid impurities, in the presence of a catalyst system formed in situ in the reaction admixture by the addition thereto of (i) an organic acid selected from the class consisting of acetic, propionic, butyric, valeric, caproic, enanthic, caprilic, pelargonic, lauric, stearic, benzoic, toluic and carbolic acids, and (ii) a compound selected from the class consisting of metal oxides and metal hydroxides in which the metal is selected from the class consisting of lithium, sodium, potassium, rubidium, cesium, francium, beryllium, magnesium, calcium, strontium, barium and radium, thus forming in situ in the admixture (a) a catalyst consisting essentially of an alkaline metal salt of the organic acid and (b) alkaline metal salts of the acid impurities of the methyl alkyl ketone, maintaining the resulting admixture in active refluxing action, separating from the refluxed vapors the water of condensation vapors and removing the said water vapors from the zone of reaction as they are formed, and recovering from the resulting reaction admixture the $N,N^1$-di(methylalkylidene)-p-phenylenediamine.

2. The process defined in claim 1 in which the ketone is methyl hexyl ketone.

3. The process defined in claim 1 in which the organic acid is pelargonic acid.

4. The process defined in claim 1 in which the alkaline metal salt of an organic acid is sodium pelargonate.

5. The process defined in claim 1 in which the ketone is methyl hexyl ketone, the organic acid is pelargonic acid, and the alkaline metal salt of pelargonic acid is formed in situ in the reaction admixture by the addition thereto of sodium hydroxide.

6. A process of manufacturing a $N,N^1$-di(methylalkylidene)-p-phenylenediamine by the reaction of p-phenylenediamine with a methylalkyl ketone having strong acid impurities therein comprising reacting under active refluxing conditions an admixture of p-phenylenediamine, and a methyl alkyl ketone having strong acid impurities in the presence of a catalyst system consisting essentially of (i) an organic acid selected from the class consisting of acetic, propionic, butyric, valeric, caproic, enanthic, caprilic, pelargonic, lauric, stearic, benzoic, toluic and carbolic acids and (ii) an alkaline metal salt of one of the above listed organic acids in which the metal is selected from the class consisting of lithium, sodium, potassium, rubidium, cesium, francium, beryllium, magnesium, calcium, strontium, barium and radium, maintaining the resulting admixture in active refluxing action, separating from the refluxed vapors the water of condensation vapors and removing the said water vapors from the zone of reaction as they are formed, and recovering from the resulting reaction admixture the $N,N^1$-di(methylalkylidene)-p-phenylenediamine.

7. The process defined in claim 6 in which the alkaline metal salt of an organic acid is sodium pelargonate.

8. The process defined in claim 6 in which the ketone is methyl hexyl ketone.

9. The process defined in claim 6 in which the organic acid is pelargonic acid.

10. The process defined in claim 6 in which the ketone is methyl hexyl ketone, the organic acid is pelargonic acid, and the alkaline metal salt of an organic acid is sodium pelargonate.

References Cited in the file of this patent

UNITED STATES PATENTS

| 1,931,394 | Scott | Oct. 17, 1933 |
| 1,938,890 | Britton et al. | Dec. 12, 1933 |
| 1,939,192 | Williams | Dec. 12, 1933 |
| 2,160,223 | Meuser et al. | May 30, 1939 |
| 2,712,031 | Huffman | June 28, 1955 |
| 2,975,213 | Layer | Mar. 14, 1961 |
| 2,984,682 | Kaeding | May 16, 1961 |

FOREIGN PATENTS

| 265,931 | Great Britain | Apr. 30, 1928 |

OTHER REFERENCES

Rothenfusser et al.: C.A., vol. 2, pp. 1969–1970, (1908) QD1 A51.